C. E. WOODS.
COMBINED SPEED GOVERNOR AND SPEEDOMETER FOR TALKING MACHINES.
APPLICATION FILED MAR. 5, 1914.
1,171,683. Patented Feb. 15, 1916.
2 SHEETS—SHEET 1.
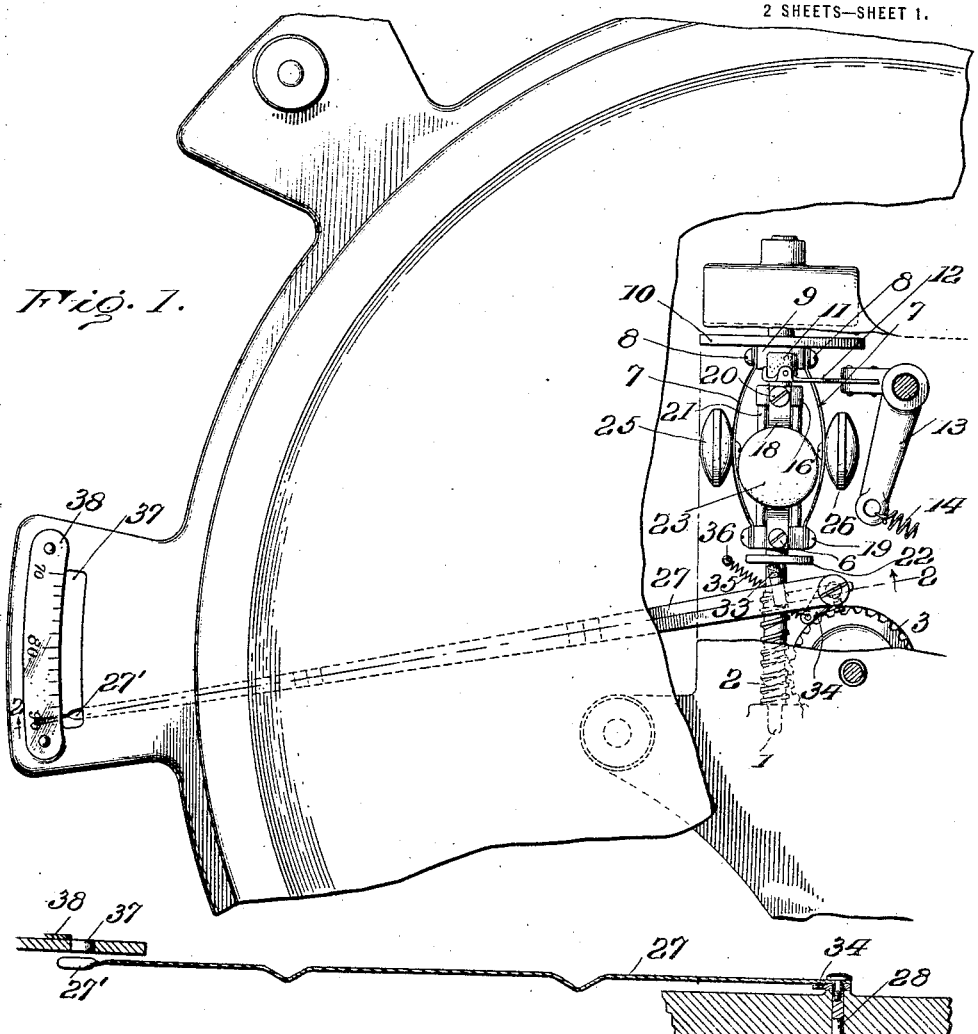
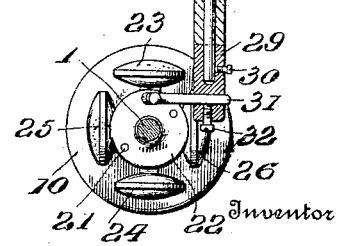

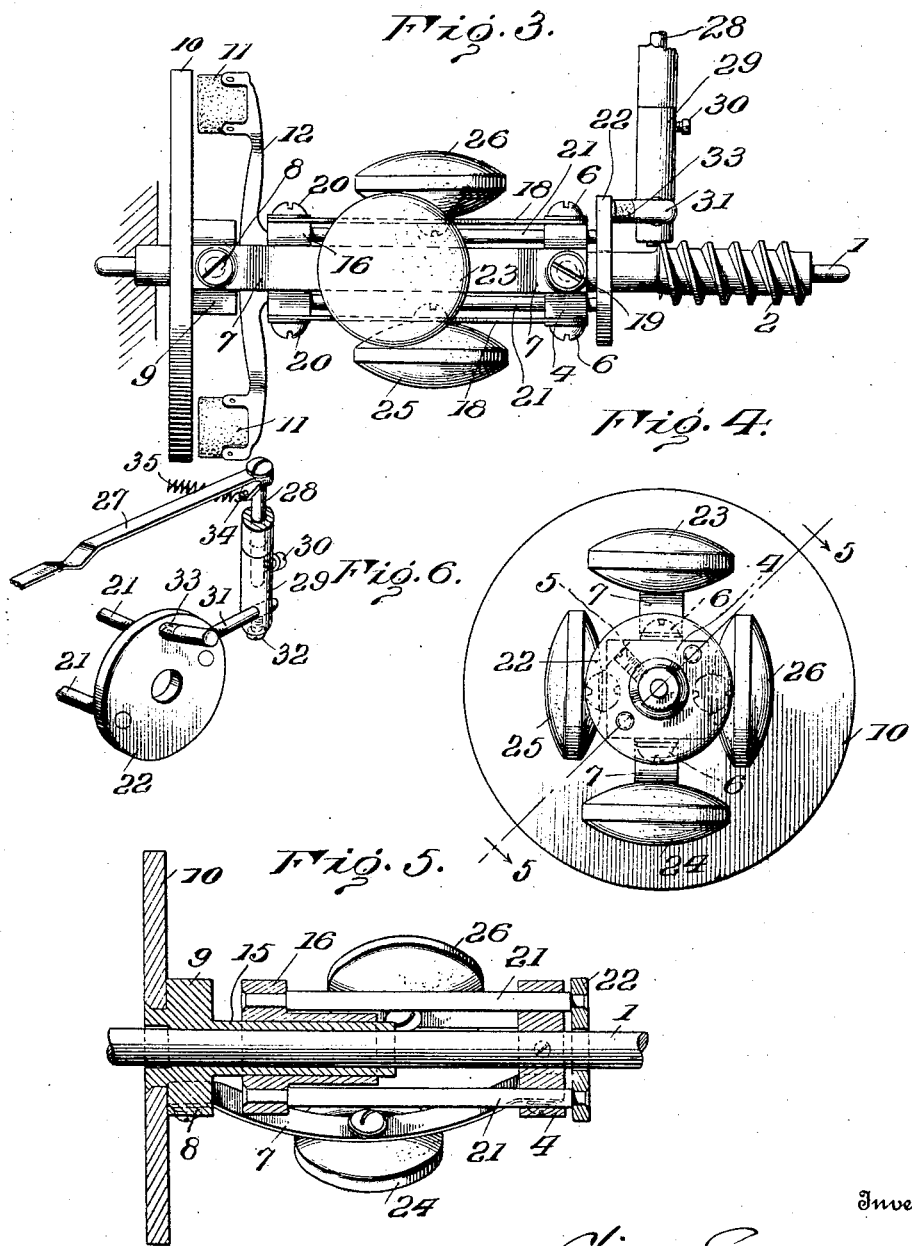

UNITED STATES PATENT OFFICE.

CLINTON E. WOODS, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

COMBINED SPEED-GOVERNOR AND SPEEDOMETER FOR TALKING-MACHINES.

1,171,683.   Specification of Letters Patent.   Patented Feb. 15, 1916.

Application filed March 5, 1914. Serial No. 822,688.

*To all whom it may concern:*

Be it known that I, CLINTON E. WOODS, of Bridgeport, Connecticut, have invented a new and useful Improvement in Combined Speed-Governors and Speedometers for Talking-Machines, which invention is fully set forth in the following specification.

This invention relates to a combined governor and speedometer for talking machines, and has for its object to simplify the construction and improve the accuracy and efficiency of devices of this character.

The invention will be best understood from the accompanying drawings and description and the claims appended thereto. The inventive idea is capable of receiving a variety of mechanical expressions, one of which is shown in the accompanying drawings, but it is to be understood that the drawings are for the purpose of illustration only, and are not designed to define the limits of the invention, reference being had to the appended claims for this purpose.

In said drawings, Figure 1 is a top plan view of the invention; Fig. 2 is a sectional elevation on the line 2—2 of Fig. 1; Fig. 3 is a side elevation of the operating mechanism looking from the left in Fig. 1; Fig. 4 is a rear elevation looking from the right in Fig. 3, with the driving worm and the indicating needle shaft removed; Fig. 5 is a central longitudinal section of the parts mounted on the governor shaft; and Fig. 6 is a detail of the speedometer disk, showing the means by which it operates the needle.

Referring to the drawings, in which like reference numerals indicate like parts, and referring first to Figs. 3, 4 and 5, 1 is the governor shaft mounted in suitable bearings in the motor frame, and having a worm 2 thereon meshing with the worm gear 3 operated by the motor. A disk 4 is keyed to the governor shaft 1 by means of a set screw 5, said disk 4 preferably being rectangular in form, thereby providing it with four flat sides. Secured to two of the opposite flat sides of said disk, as by screws 6, 6, are two springs 7, 7, the other end of said springs being secured by screws 8, 8, to a sleeve 9 mounted on the governor shaft 1 so as to turn therewith, but free to slide thereon. Said sleeve 9 carries the usual friction brake disk 10, in close proximity to which are mounted the friction pads 11, 11. These friction pads are mounted on the usual fork 12, supported and controlled by a bell crank lever 13 against the tension of a spring 14, as is usual in this art.

The sleeve 9 is preferably provided with a prolonged bearing 15 (see Fig. 5) on the shaft 1, and mounted to slide on this prolonged bearing is a second sleeve 16, also preferably provided with a prolonged bearing. Two springs 18, 18, are secured by screws 19 to opposite sides of the rectangular disk 4. The other ends of said springs 18, 18, are secured by screws 20, 20, to the sleeve 16. Two rods 21, 21, are secured in the sleeve 16 and project therefrom parallel with the governor shaft 1 and through openings formed in the disk 4, and have on their ends, beyond said disk, a disk 22. Suitable weights 23, 24, 25 and 26 are secured one to each of the springs 7 and 18, midway between the ends of said springs.

A speed indicating needle 27 is keyed to a vertical shaft 28 mounted in suitable bearings in the bed-plate of the machine, which shaft at its lower end has a sleeve 29 secured thereto, as by set-screw 30. Passing horizontally through said sleeve is a rod 31, secured in position by a set-screw 32, which rod bears on its end or an angular extension thereof a friction pad 33 operating in close juxtaposition to the disk 22. An arm 34 is keyed to the shaft 28, and has a spring 35 secured thereto at one end, the other end being secured to a suitable abutment, as 36.

The speed indicator pointer or needle 27 is located under the bed-plate of the machine, its tip or point 27′ positioned immediately under a slot 37 (Fig. 1), through which it may be readily seen, and a suitable scale 38 is provided on the bed-plate in proximity to the slot 37, preferably having thereon devices indicating speed from 70 to 90 revolutions a minute.

Operation: The governor shaft 1 being driven by the worm gear 3 connected to the motor, said shaft revolves, and the weights 23, 24, on springs 7, 7, moving outward under the influence of centrifugal force, draw the sleeve 9, and with it the friction disk 10, against the pads 11, and the friction between these pads and the disk 10 serves to govern the speed of the motor, in a way which will be well understood. In like manner, the weights 25, 26, on the springs 18, 18, move outward under the influence of centrifugal force, causing the sleeve 16 to move from left to right (Fig. 3), and thereby move the rods 21, 21 from left to right through the openings in the disk 4. This shifts the disk 22 against the pad 33 on the angular arm 31, the movements of the disk thus serving, through the arm 31, to turn the shaft 28, and with it the indicator needle 27, against the tension of the spring 35.

It will be observed that all of the springs carrying the weights 23, 24, 25 and 26, are anchored to the governor shaft by the single disk 4; that the two sleeves 9 and 16 both move toward this anchoring disk 4 under the influence of centrifugal force; and that all of these movements, as well as the movements of the disks 10 and 22, are effected without the introduction of any pivoted levers or the employment of any bearings. This avoids any wear or lost motion, contributes greatly to the simplicity and cheapness of construction, and provides a highly effective motor-governing device, and an efficient and accurate speed-indicator.

The manner in which the arm 31 is secured to the needle shaft 28 affords a simple but exceedingly accurate means for adjusting the device, to the end that the indicating needle 27, in conjunction with the scale 38, may serve to accurately indicate the number of revolutions per minute imparted by the motor to the turn table and record of the talking machine.

It will be apparent to those skilled in the art that various modifications and changes in the specific form of construction herein shown may be resorted to without departing from the spirit of the invention as defined in the claims hereof.

What is claimed is:—

1. In a device of the character described, the combination of a motor-driven shaft, an element secured to and revolving with said shaft, a sleeve slidably mounted on said shaft and revolving therewith, a brake disk on said sleeve, weighted spring connections between said element and said sleeve, a second sleeve slidably mounted on said first sleeve and revolving with said shaft, weighted spring connections between said element and said second sleeve, projections on said second sleeve extending parallel with said motor-driven shaft, a disk carried by said projections, a scale, an indicating needle or pointer associated therewith, and operating connections between said last-named disk and said needle or pointer.

2. In a device of the character described, the combination of a motor-driven shaft, an element fixed to said shaft and revolving therewith, a brake disk slidably mounted on said shaft and revolving therewith, weighted spring connections between said disk and said element, a sleeve slidably mounted on said shaft to revolve therewith, weighted spring connections between said sleeve and said element, a disk connected to said sleeve, a scale, a pointer associated therewith, and means in operative relation with said last-named disk and connected to said pointer.

3. In a device of the character described, the combination of a motor-driven shaft, a disk having flat faces on its periphery and secured to said shaft, a brake disk slidably mounted on said shaft and revolving therewith, two weighted springs connected at one end to diametrically opposite flat faces of said first-named disk and at the other end to said brake disk, a sleeve slidably mounted on said shaft and revolving therewith, two weighted springs connected at one end to diametrically opposite flat faces of said first-named disk and at the other end to said sleeve, rods projecting from said sleeve through openings in said flat-faced disk, a scale, a pointer associated therewith, and operative connections between said rods and pointer.

4. In a device of the character described, the combination of a motor-driven shaft, two concentric sleeves slidably mounted on said shaft and revolving therewith, weighted spring connections between said sleeves and said shaft, a brake disk operated by one of said sleeves, and an indicating pointer operated by the other sleeve.

5. In a device of the character described, the combination of a motor-driven shaft, a block anchored to said shaft, two sleeves slidably mounted on said shaft and revolving therewith, weighted spring connections between each of said sleeves and said block, a brake disk on one of said sleeves, projections extending from the other sleeve through openings in said block, an indicating pointer, and operative connections between said rods and said pointer.

6. In a device of the character described, the combination of a motor-driven shaft, two concentric sleeves rotatively fixed to the shaft but movable longitudinally thereof independently of each other, a speed regulating device connected to one sleeve, a speed indicator connected to the other sleeve, and two independent sets of centrifugally controlled weights driven by the shaft and operatively connected respectively to the said sleeves.

7. In a device of the character described, the combination of a motor-driven shaft, two independent sets of spring-mounted centrifugally controlled weights connected to the shaft and having common planes of rotation, a speed regulating device connected to the weights of one set, and a speed indicator connected to the weights of the other set.

8. In a device of the character described, the combination of a motor-driven shaft, two independent sets of spring-mounted centrifugally controlled weights, connected to the shaft and having common planes of rotation, two disks rotatively fixed to the shaft but movable longitudinally thereof independently of each other under the control of the said weights respectively, friction pads engaging one disk to regulate the speed of the shaft, a speed indicating device, and a friction pad spring pressed against the other disk and operatively connected with the speed indicating device.

In testimony whereof I have signed this specification in the presence of two subscribing witnesses.

CLINTON E. WOODS.

Witnesses:
 JOHN S. GRIFFITH,
 JOHN R. PETRIE.